United States Patent

Takasaki

[11] Patent Number: 5,556,082
[45] Date of Patent: Sep. 17, 1996

[54] CUSHION UNIT

[75] Inventor: Hideki Takasaki, Saitama, Japan

[73] Assignee: Showa Corporation, Gyoda, Japan

[21] Appl. No.: 336,545

[22] Filed: Nov. 9, 1994

[30] Foreign Application Priority Data

Dec. 7, 1993 [JP] Japan .................................. 5-339875
Dec. 7, 1993 [JP] Japan .................................. 5-339876

[51] Int. Cl.$^6$ .................................................. B60G 13/00
[52] U.S. Cl. ..................... 267/218; 188/322.14; 280/6.12
[58] Field of Search .................................... 267/218, 221, 267/DIG. 1, DIG. 2; 188/322.11, 322.13, 322.14, 315, 318; 280/6.12, 708, 710, 712

[56] References Cited

U.S. PATENT DOCUMENTS

| | | | |
|---|---|---|---|
| 3,150,867 | 9/1964 | Droegkamp | 267/218 |
| 3,385,589 | 5/1967 | Erdmann | 267/221 X |
| 3,414,278 | 12/1968 | Schmid | 267/218 X |
| 4,667,941 | 5/1987 | Hayashi . | |
| 5,376,138 | 12/1994 | Bouchard et al. | 188/322.13 X |
| 5,400,880 | 3/1995 | Ryan | 267/218 X |

FOREIGN PATENT DOCUMENTS

| | | |
|---|---|---|
| 57-192643 | 11/1982 | Japan . |
| 6015210 | 1/1985 | Japan .................................. 267/218 |
| 2164417 | 3/1986 | United Kingdom . |

*Primary Examiner*—Lee Young
*Attorney, Agent, or Firm*—Dvorak & Traub

[57] ABSTRACT

A cushion unit includes a shock absorber and a suspension spring. The shock absorber includes an open/close valve and a check valve which are arranged in parallel with each other. To increase the height of a vehicle body, the open/close valve is closed so that a piston pressure chamber is allowed to communicate with a spring bracket pressure chamber via the check valve. This causes a hydraulic fluid in the piston pressure chamber to be supplied into the spring bracket pressure chamber under pressure. Accordingly, a cylinder spring bracket slidably arranged around a cylinder of the shock absorber moves upward due to the pressure increase in the spring bracket pressure chamber. Since a lower end of the suspension spring is held against the cylinder spring bracket, the upward movement of the cylinder spring bracket compresses the suspension spring to increase a reactive force thereof so that the height of the vehicle body is increased due to the increased reactive force of the suspension spring.

5 Claims, 14 Drawing Sheets

NORMAL-HEIGHT OPERATION

HEIGHT-INCREASING OPERATION

INCREASED-HEIGHT HOLDING OPERATION

HEIGHT-LOWERING OPERATION

NORMAL-HEIGHT OPERATION

HEIGHT-INCREASING OPERATION

INCREASED-HEIGHT HOLDING OPERATION

HEIGHT-LOWERING OPERATION

CUSHION UNIT

BACKGROUND OF THE INVENTION

1. Field of the Invention

The present invention relates to a cushion unit arranged between a body and an axle of an automotive vehicle, and more specifically, to such a cushion unit that can control a height of the vehicle.

2. Description of the Background Art

Among the conventional cushion units provided between bodies and axles of the automotive vehicles, there have been available such cushion units that can adjust height of the vehicles. Japanese First (unexamined) Patent Publication No. 57-192643 discloses one of these, wherein a cylinder spring bracket is provided around an outer circumference of a cylinder of a hydraulic shock absorber, a rod spring bracket is provided around a piston rod via a spring bracket pressure chamber, and a suspension spring is interposed between those spring brackets. Further, a hydraulic oil is introduced into the spring bracket pressure chamber under pressure due to the extension/compression motion of the shock absorber to change a reactive force of the suspension spring so as to control the height of the vehicle.

In the foregoing conventional cushion unit, since the hydraulic fluid is not supplied to the spring bracket pressure chamber by a hydraulic pump or the like, but by using the extension/compression motion of the shock absorber, the cost of added apparatus is avoided.

However, in the foregoing conventional cushion unit, the hydraulic fluid in the cylinder is conducted to the spring bracket pressure chamber at every extension/on compression of the shock absorber so that the height control is executed even when such a height control is not necessary, leading to a possibility that the height control cannot be performed selectively only at the will of the driver.

SUMMARY OF THE INVENTION

Therefore, it is an object of the present invention to provide an improved cushion unit which can perform a height control selectively only on demand and without causing increase of cost of the equipment.

In the present invention, communication between the piston pressure chamber and the spring bracket pressure chamber is allowed via a check valve when the open/close valve is closed. The hydraulic fluid in the piston pressure chamber is conducted to the spring bracket pressure chamber under pressure due to the reciprocating motion of the piston so that the cylinder spring bracket is displaced in the axial direction of the cylinder to increase the reactive force of the suspension spring. Further, since communication between the spring bracket pressure chamber and the reserve chamber is allowed via the open/close valve when this open/close valve is opened, the hydraulic oil in the spring bracket pressure chamber is returned to the reserve chamber so that the cylinder spring bracket is displaced in the axial direction of the cylinder to decrease the reactive force of the suspension spring. Due to the variation in the reactive force of the suspension spring, the height of the vehicle can be adjusted when the piston rod and the cylinder are arranged between the vehicle body and the vehicle wheel.

Since this height control is performed, for example, by operating the operating section provided at the vehicle to open or close the open/close valve, the height control can be performed only when needed.

Further, since height control is achieved based on the supply of the hydraulic fluid caused by the reciprocating motion of the piston, a hydraulic pump or the like is not required so that the height control can be performed without cost of added equipment.

Further, since the open/close valve is in the form of the rotary valve or the spool valve, few parts are involved and these are simple in design. Accordingly, further cost saving due to simplification can be realized.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

FIRST EMBODIMENT (FIGS. 1–7)

FIGS. 1–7 will be referred to indescribing the first embodiment of this invention.

Figure 1:
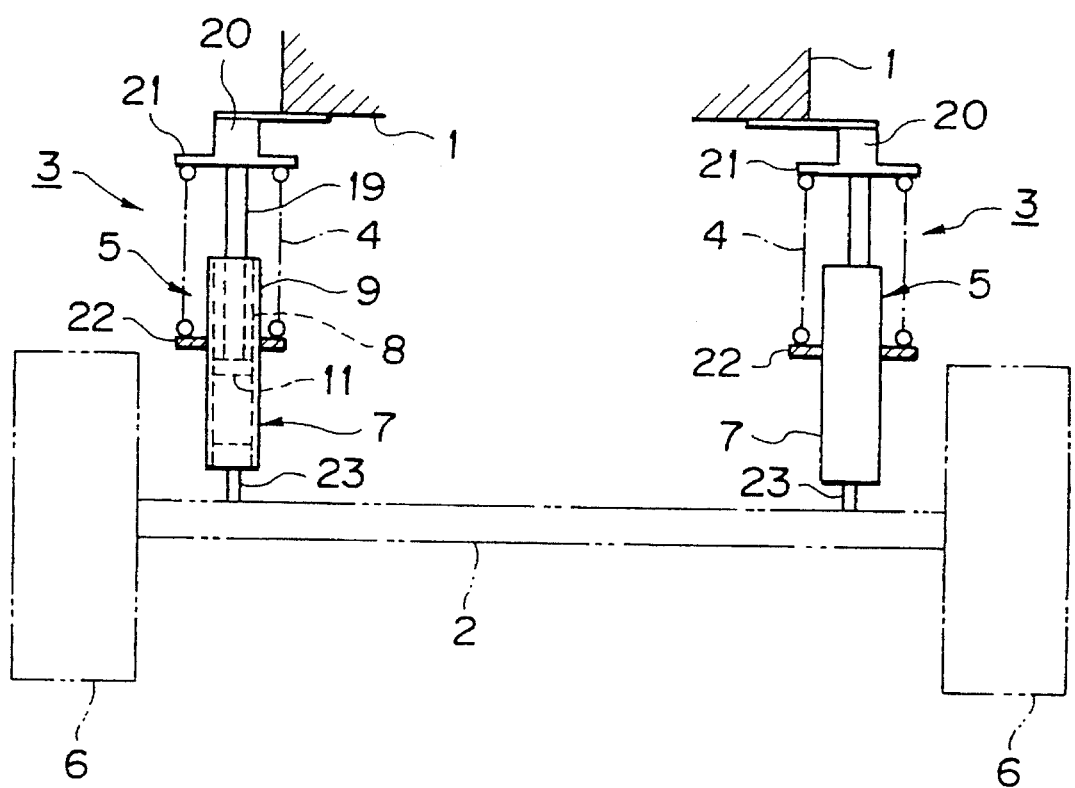
FIG. 1 is a front view showing a cushion unit according to a first embodiment of the present invention, wherein the cushion unit is applied to an automotive vehicle.

As shown in FIG. 1, a pair of cushion units 3 are disposed between a body 1 and an axle 2 of an automotive vehicle so as to absorb the shock transmitted from the road surface. Each cushion unit 3 includes a suspension spring 4 and a hydraulic shock absorber 5 received in the suspension spring 4. The suspension spring 4 works to absorb the shock from the road surface while the shock absorber 5 works to damp the extension/compression motion of the cushion unit 3 caused by the shock absorbing action of the suspension spring 4. In this embodiment, the cushion unit 3 is provided for each of rear wheels 6, and the known cushion unit is provided for each of front wheels.

Figure 2:
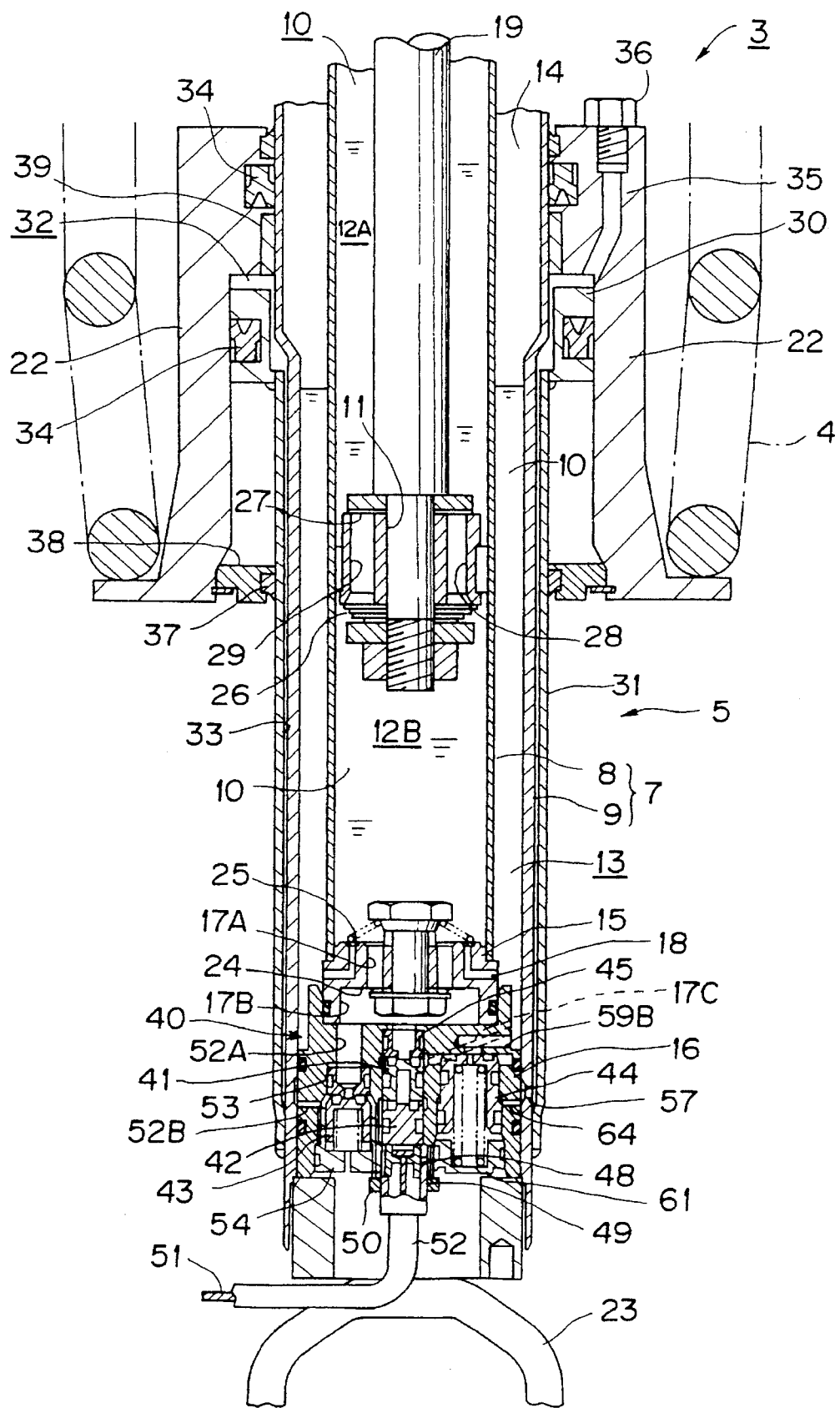
FIG. 2 is a sectional view showing a portion of the cushion unit shown in FIG. 1 on an enlarged scale.

As shown in FIG. 2, the shock absorber 5 has a cylinder 7 which includes an inner tube 8 and an outer tube 9. The inner tube 8 is filled with a hydraulic oil 10, and a piston 11 is slidably received in the inner tube 8. The piston 11 defines an upper piston pressure chamber 12A and a lower piston pressure chamber 12B in the inner tube 8. A reserve chamber 13 is formed between the inner and outer tubes 8 and 9 and filled with the hydraulic fluid 10 at its lower side and with gas (air) 14 at its upper side in FIG. 2.

A bottom piece 15 is fixed at a lower end of the inner tube 8. Further, a housing 16 of a switching device 40, which will be described later, is fitted over the bottom piece 15. Compression-side communication passages 17A, 17B and 17C are formed in the bottom piece 15 and the housing 16, and an extension-side communication passage 18 is formed in the bottom piece 15, so as to allow communication between the lower piston pressure chamber 12B and the reserve chamber 13.

The piston 11 is bolted to a piston rod 19. The piston rod 19 extends out from within the cylinder 7 so as to have an upper end which is fixed to a rod end 20 as shown in FIG. 1. A rod spring bracket 21 is fixedly coupled to the rod end 20. On the other hand, a cylinder spring bracket 22 is provided on the outer circumference or periphery of the outer tube 9 of the cylinder 7. The cylinder spring bracket 22 is slidable in an axial direction of the outer tube 9. The suspension spring 4 is interposed between the rod spring bracket 21 and the cylinder spring bracket 22.

In FIG. 2, the outer tube 9 is fitted over a mounting bracket 23 so that the cylinder 7 is supported on the vehicle axle 2 via the mounting bracket 23, while the rod end 20 is connected to the vehicle body 1. With this structure, the cushion unit 3 absorbs the shock from the road surface by means of the suspension spring 4. Further, the cushion unit 3 attenuates the extension/compression motion of the cushion unit 3 caused by the shock absorbing action of the suspension spring 4, by means of, mainly, a compression-side disc valve 24 and a first valve 26.

The bottom piece 15 is provided with the compression-side disc valve 24 and an extension-side check valve 25. The compression-side disc valve 24 is arranged to allow the hydraulic fluid 10 to pass only from the compression-side communication passage 17A to the compression-side communication passage 17B. On the other hand, the extension-side check valve 25 is arranged to allow the hydraulic fluid 10 to pass only from the reserve chamber 13 to the lower piston pressure chamber 12B via the extension-side communication passage 18. The piston 11 is provided with the first valve 26 and a second valve 27. Further, through the piston 11, compression-side flow passages 28 and extension-side flow passages 29, each extending in an axial direction of the piston 11, are formed alternately in a circumferential direction of the piston 11. The first valve 26 is arranged to allow the hydraulic fluid 10 to pass only from the upper piston pressure chamber 12A to the lower piston pressure chamber 12B via the extension-side flow passages 29. On the other hand, the second valve 27 is arranged to allow the hydraulic fluid 10 to pass only from the lower piston pressure chamber 12B to the upper piston pressure chamber 12A via the compression-side flow passages 28.

In a compression stroke of the cushion unit 3 during a normal-height operation, the hydraulic fluid 10 in the lower piston pressure chamber 12B flows into the upper piston pressure chamber 12A via the compression-side flow passages 28 and the second valve 27. Simultaneously, as shown by continuous-line arrows in FIG. 3, an upper open/close valve 41, which will be described later, is opened to allow the hydraulic fluid 10 in the lower piston pressure chamber 12B to reach the reserve chamber 13 via the compression-side communication passage 17A, the compression-side disc valve 24 and the compression-side communication passages 17B and 17C in the order named. The flow or fluid resistance caused by the compression-side disc valve 24 generates the main damping force during the compression stroke.

Figure 3:
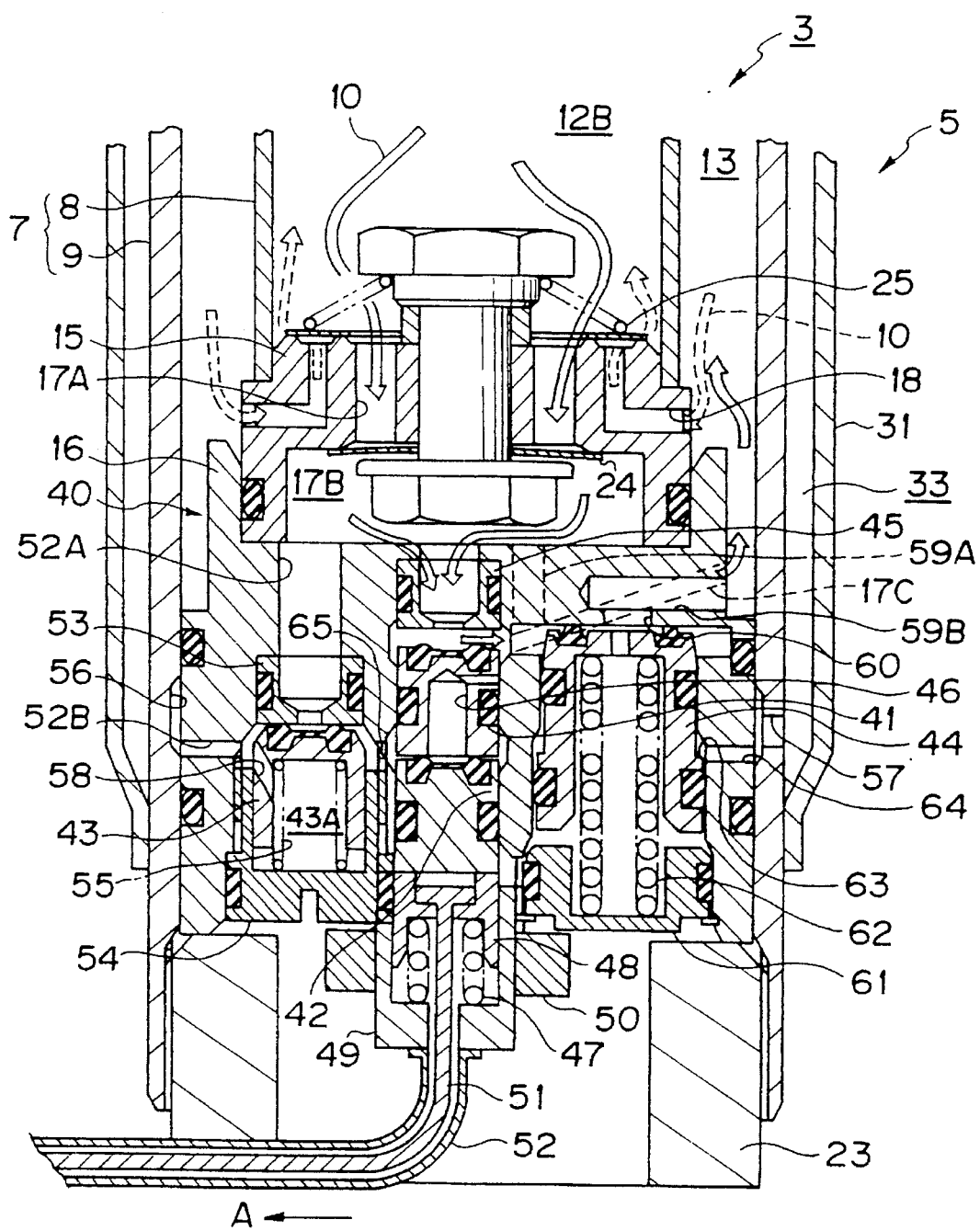
FIG. 3 is a sectional view showing a switching device shown in FIG. 2 on an enlarged scale portraying a normal-height operation of the cushion unit.

On the other hand, in an extension stroke of the cushion unit 3 under the normal-height operation, as shown by dashed-line arrows in FIG. 3, the hydraulic fluid 10 in the reserve chamber 13 is allowed to reach the lower piston pressure chamber 12B via the extension-side communication passage 18 and the extension-side check valve 25. Simultaneously, in FIG. 2, the hydraulic fluid 10 in the upper piston pressure chamber 12A flows into the lower piston pressure chamber 12B via the extension-side flow passages 29 and the first valve 26. The flow or fluid resistance caused by the first valve 26 generates the main damping force during the extension stroke.

As shown in FIG. 2, a bulkhead member 30 is fitted in the cylinder spring bracket 22 so as to be displaceable in an axial direction of and relative to the cylinder spring bracket 22. The bulkhead member 30 is fixedly supported to the outer tube 9 via a support tube 31 and defines a spring bracket pressure chamber 32 between the cylinder spring bracket 22 and the outer tube 9. The spring bracket pressure chamber 32 is allowed to communicate with the lower piston pressure chamber 12B via a hydraulic fluid introducing passage 33 defined between the outer tube 9, the support tube 31, and a later-described check valve 43 when the check valve 43 is opened. A fluid seal 34 is provided between the bulkhead member 30 and the cylinder spring bracket 22 so as to seal the spring bracket pressure chamber 32.

An air vent passage 35 is formed through the cylinder spring bracket 22. The air vent passage 35 communicates with the spring bracket pressure chamber 32 at its one end and with the outside of the shock absorber 5 at its other end. In FIG. 2, a closure plug 36 is secured to the air vent passage 35 so as to close it. When assembling the cushion unit 3, the closure plug 36 is detached to allow the air in the spring bracket pressure chamber 32 to escape so that the spring bracket pressure chamber 32 is filled with only the hydraulic fluid 10. A seal member 38 with a dust seal 37 is provided at a lower end of the cylinder spring bracket 22. A bush 30 is disposed between the cylinder spring bracket 22 and the outer tube 9.

As shown in FIGS. 2 and 3, the switching device 40 is provided at a lower end portion of the outer tube 9. The switching device 40 has the housing 16 which includes therein the upper open/close valve 41 and a lower open/close valve 42 arranged adjacent to each other in a vertical direction, and further includes therein the check valve 43 and a relief valve 44.

Figure 4:
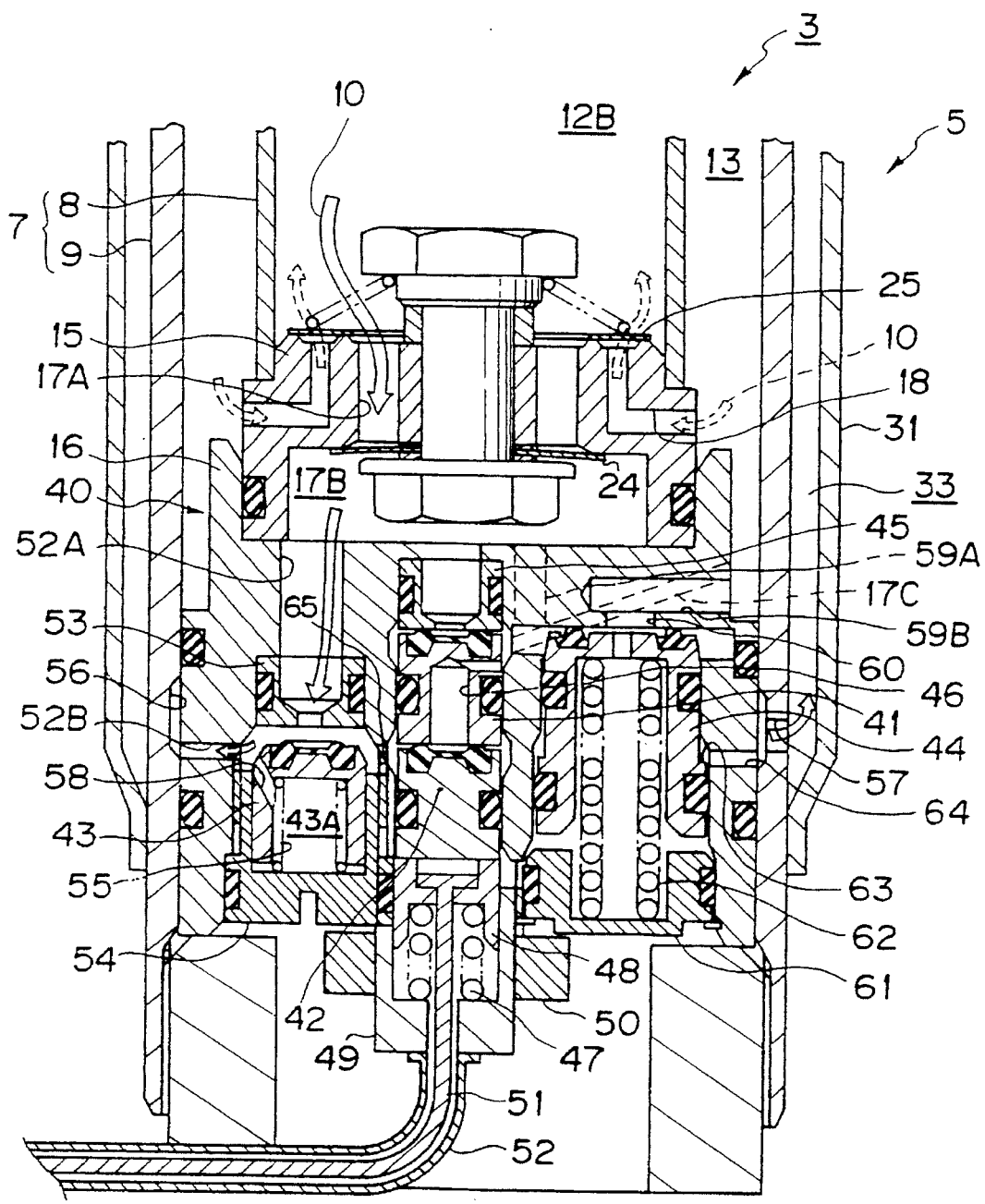
FIG. 4 is a sectional view showing the switching device shown in FIG. 2 on an enlarged scale portraying a height-increasing made of the cushion unit.
Figure 5:
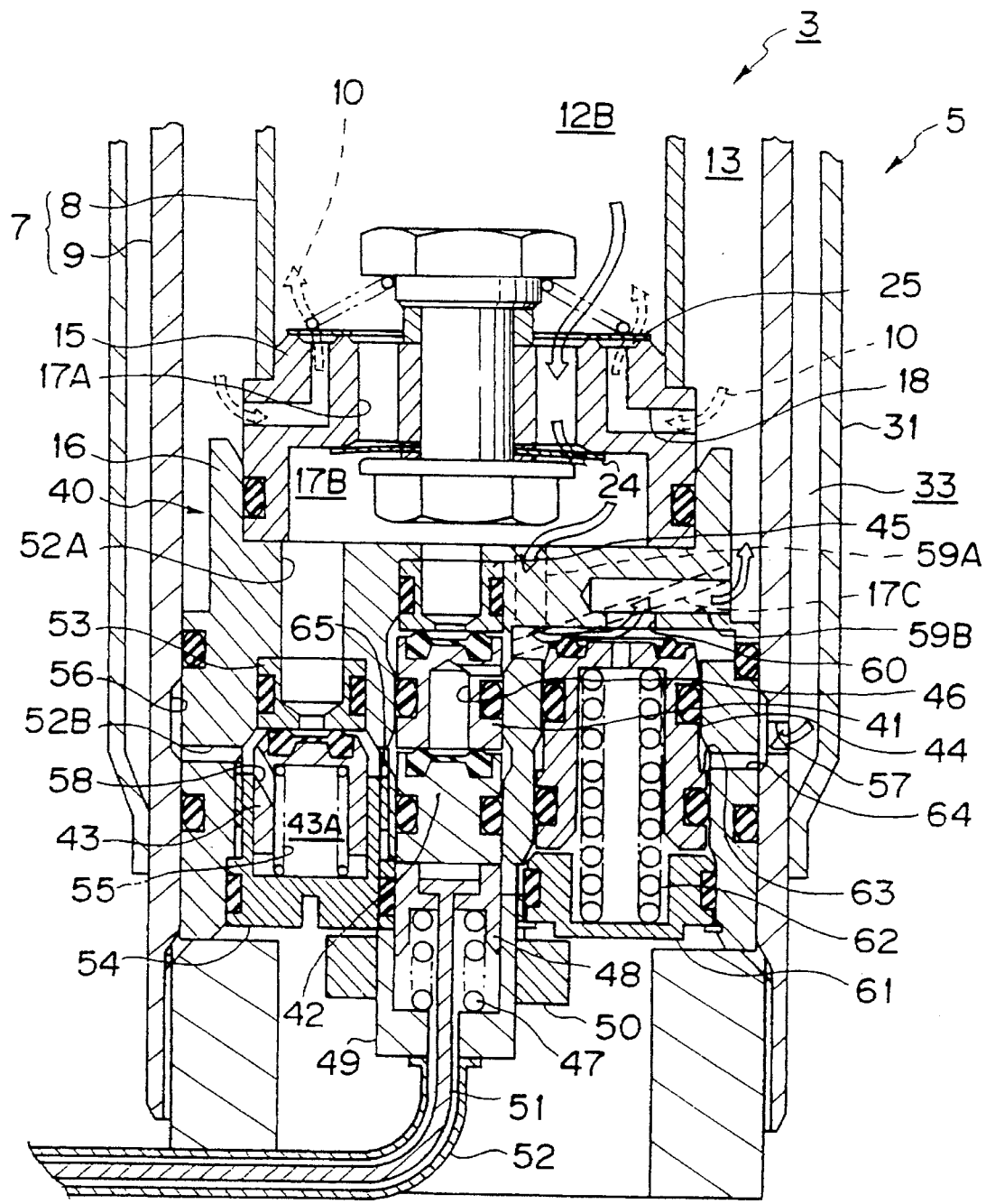
FIG. 5 is a sectional view showing the switching device shown in FIG. 2 on an enlarged scale describing an increased-height holding operation of the cushion unit.

The upper open/close valve 41 opens or closes a valve seat 45 disposed between the compression-side communication passages 17B and 17C in the housing 16. On the other hand, the lower open/close valve 42 opens or closes a flow passage 46 formed in the upper open/close valve 41. When the upper open/close valve 41 and the lower open/close valve 42 are pressed by an operating sleeve 48 which is urged by a spring 47, the upper open/close valve 41 abuts against the valve seat 45 to block communication between the compression-side communication passages 17B and 17C, and the lower open/close valve 42 closes the flow passage 46, as shown in FIGS. 4 and 5.

The operating sleeve 48 is slidably received in a sleeve housing 49, and the spring 47 is interposed between the operating sleeve 48 and the sleeve housing 49. The sleeve housing 49 is screwed into the housing 16 and then fixed with a lock nut 50. An operating wire 51 has one end engaged with the operating sleeve 48 and the other end connected to a later-described operating section 70 at a driver's seat or at a load-carrying platform. The operating wire 51 is disposed within and protected by a conduit 52.

Figure 7A:
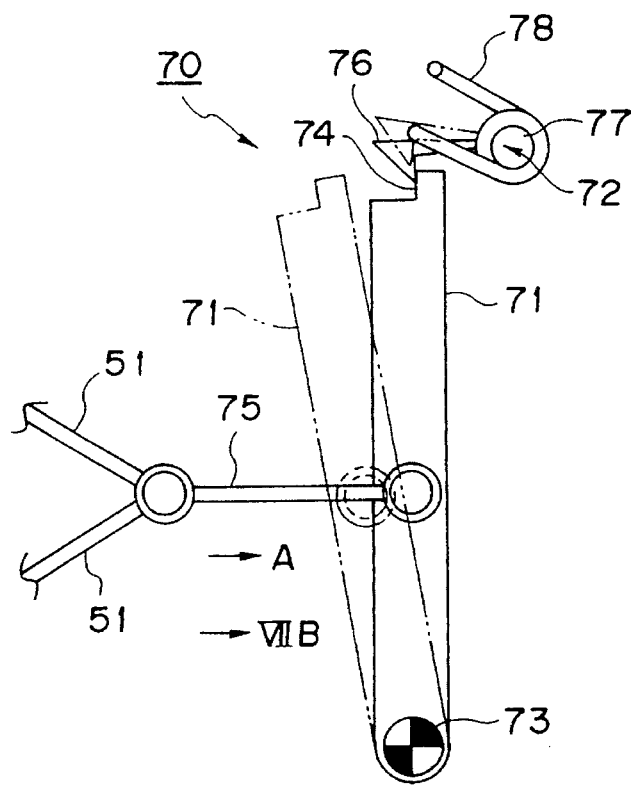
FIG. 7A is a side view showing an operating section.
Figure 7B:
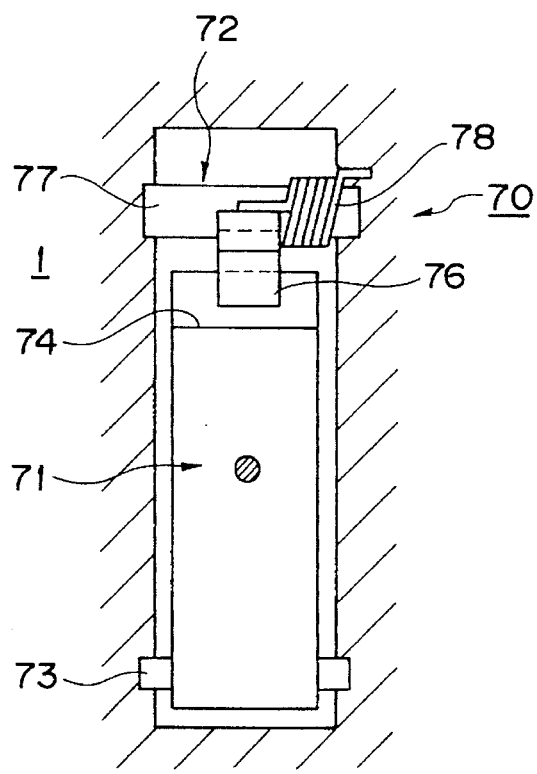
FIG. 7B is a diagram showing the operating section as seen in a direction VII B in FIG. 7A.
Figure 7C:
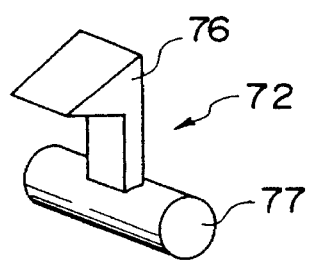
FIG. 7C is a perspective view showing an operating pawl in FIG. 7A.

As shown in FIGS. 7A, 7B and 7C, the operating section 70 includes an operating lever 71 and an operating pawl 72.

The operating lever 71 is pivotally supported at its one end by a pin 73 which is fixed to the vehicle body 1 at the driver's seat, the load-carrying platform or the like. The operating lever 71 has an engagement portion 74 at an end. A coupling wire 75 has one end connected to the operating lever 71 at its middle position and the other end connected to the operating wires 51 of the cushion units 3 for both the rear-right wheel and the rear-left wheel.

The operating pawl 72 has an engagement portion 76 and a stem portion 77 which is rotatably supported to the vehicle body 1. Between the operating pawl 72 and the vehicle body 1 is interposed an operating spring 78. A biasing force of the operating spring 78 allows the engagement portion 76 of the operating pawl 72 to engage with the engagement portion 74 of the operating lever 71.

Figure 6:
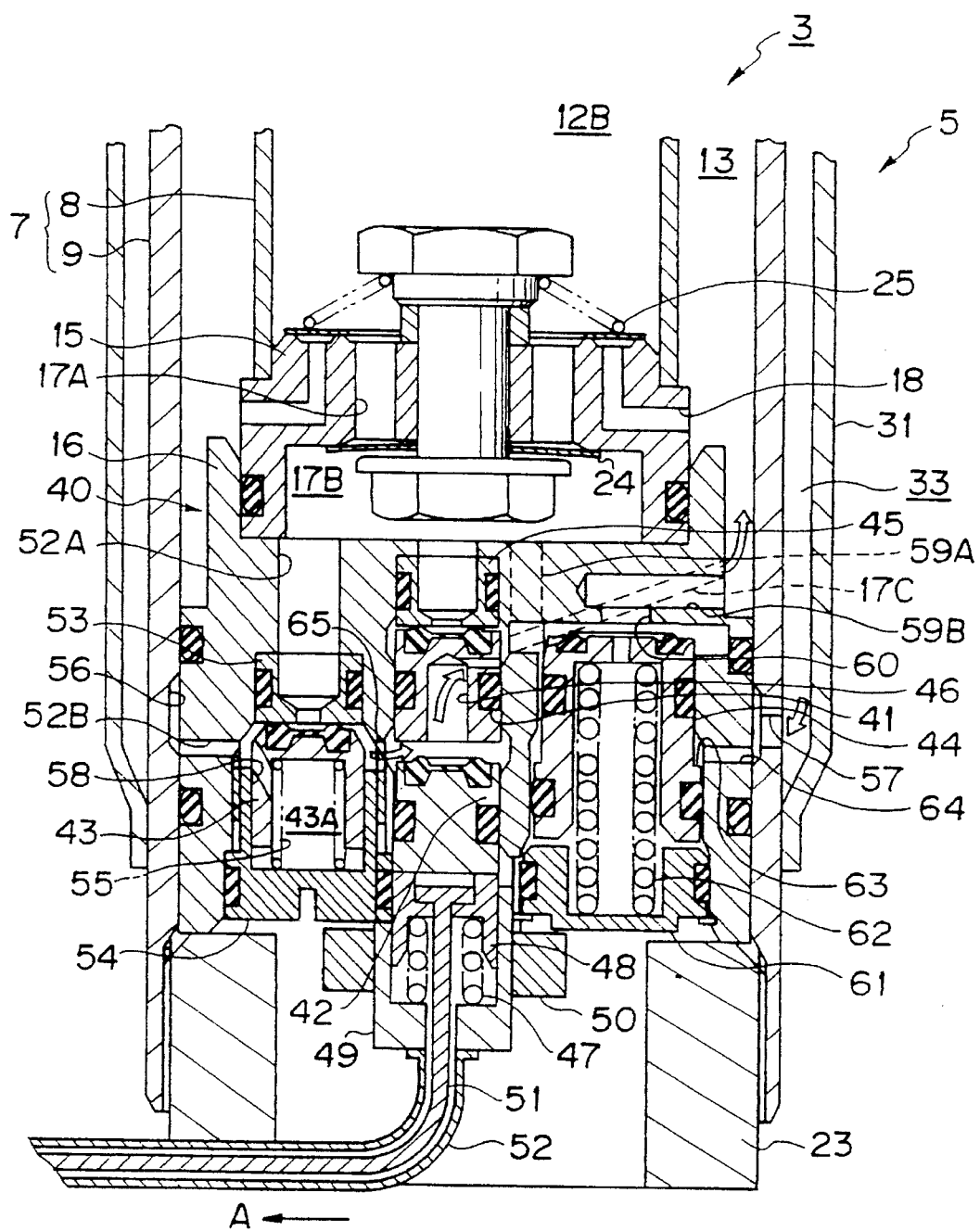
FIG. 6 is a sectional view showing the switching device shown in FIG. 2 on an enlarged scale portraying a height-lowering made of the cushion unit.

While the engagement portions 76 and 74 engage with each other, the coupling wire 75 and each of the operating wires 51 are pulled in a direction A in FIGS. 3, 6 and 7A. In this condition, the upper open/close valve 41 is opened relative to the valve seat 45 and the lower open/close valve 42 is closed or opened relative to the flow passage 46 of the upper open/close valve 41, depending on a pressure relationship between the lower piston pressure chamber 12B and the spring bracket pressure chamber 32, which will be described later. On the other hand, while the engagement portions 76 and 74 disengage from each other, the coupling wire 75 and each operating wire 51 displace in a direction opposite to the direction A due to the biasing force of the spring 47 via the operating sleeve 48. As a result, the upper and lower open/close valves 41 and 42 are pressed by the operating sleeve 48 so as to be closed as shown in FIGS. 4 and 5. Engagement and disengagement between the engagement portions 76 and 74 are achieved manually or by use of a solenoid valve or the like.

When the engagement portion 76 of the operating pawl 72 engages with the engagement portion 74 of the operating lever 71 to pull the operating wire 51 in the direction A, the upper open/close valve 41 is separated from the valve seat 45 to allow communication between the compression-side communication passages 17B and 17C in FIG. 3 since the pressure of the hydraulic fluid 10 in the lower piston pressure chamber 12B is greater than that in the spring bracket pressure chamber 32 in FIG. 3. On the other hand, the upper open/close valve 41 is seated on the valve seat 45 in FIG. 6 where the pressure in the spring bracket pressure chamber 32 is greater than that in the lower piston pressure chamber 12B. The lower open/close valve 42 is closed relative to the flow passage 46 of the upper open/close valve 41 when the pressure in the lower piston pressure chamber 12B is greater than that in the spring bracket pressure chamber 32 as shown in FIG. 3. When the pressure in the spring bracket pressure chamber 32 is greater than that in the lower piston pressure chamber 12B, the lower open/close valve 42 is opened relative to the flow passage 46 as shown in FIG. 6 so as to allow communication between the spring bracket pressure chamber 32 and the reserve chamber 13, which will be described later.

In FIG. 3, the housing 16 is formed with branch flow passages 52A and 52B branching in series from the compression-side communication passage 17B. Between these branch flow passages 52A and 52B is interposed a valve seat 53 for the check valve 43. The branch flow passage 52B further communicates with a branch groove 56 and a branch hole 57 which, in turn, communicates with the hydraulic fluid introducing passage 33. The branch groove 56 and the branch hole 57 are formed in the outer tube 9. The check valve 43 opens or closes the valve seat 53 and is arranged in parallel with the upper and lower open/close valves 41 and 42. The check valve 43 is slidably received in a sleeve 54 which is screwed into the housing 16. The check valve 43 has a shape of a covered cylinder and is provided at its inside 43A with a spring 55 which is interposed between the check valve 43 and the sleeve 54. Further, the check valve 43 is formed with a passage 58 which establishes communication between the inside 43A of the check valve 43 and the branch flow passage 52B.

The check valve 43 is urged toward the valve seat 53 by the sum of a biasing force of the spring 55 and a pressure of the hydraulic fluid 10 in the spring bracket pressure chamber 32 as exerted at the inside 43A via the passage 58. When the check valve 43 is pressed against the valve seat 53 due to a pressure differential across the check valve 43, communication between the branch flow passages 52A and 52B is prohibited. On the other hand, as shown in FIG. 4, when the upper and lower open/close valves 41 and 42 are closed to allow the hydraulic fluid 10 in the lower piston pressure chamber 12B to flow into the branch flow passage 52A and when a pressure of the hydraulic fluid 10 in the branch flow passage 52A becomes greater than the foregoing sum of the biasing force and the hydraulic pressure, the check valve 43 is separated from the valve seat 53 to be opened due to a pressure differential across the check valve 43 so that communication between the branch flow passages 52A and 52B is established.

The housing 16 is further formed with relief flow passages 59A and 59B. The relief flow passage 59A communicates with the compression-side communication passage 17B while the relief flow passage 59B communicates with the reserve chamber 13. The relief flow passages 59A and 59B communicate with each other via a relief hole 60 formed in the housing 16. The foregoing relief valve 44 works to open or close the relief hole 60.

The relief valve 44 is slidably disposed in the housing 16, with a spring 62 interposed between the relief valve 44 and a relief valve plate 61 which is fixed in the housing 16. The relief valve 44 is formed with a flange portion 63. On the other hand, the housing 16 is formed with a relief valve operating hole 64 at a position corresponding to the flange portion 63. The relief valve operating hole 64 opens into the branch groove 56 of the outer tube 9. Accordingly, pressure of the hydraulic fluid 10 in the spring bracket pressure chamber 32 acts upon the flange portion 63 via the hydraulic fluid introducing passage 33, the branch hole 57, the branch groove 56 and the relief valve operating hole 64. When this pressure becomes greater than a predetermined value, the relief valve 44 is opened against a biasing force of the spring 62 so as to allow communication between the relief flow passages 59A and 59B, as shown in FIG. 5.

Now, operations and effects of the first embodiment will be described in detail hereinbelow.

[A] Normal-Height Operation (FIG. 3)

The operating section 70 at the driver's seat or at the load-carrying platform is operated so as to engage the engagement portion 76 of the operating pawl 72 with the engagement portion 74 of the operating lever 71. This causes the operating wire 51 to be pulled in the direction A in FIG. 3 so that the operating sleeve 48 is displaced downward in FIG. 3 against the biasing force of the spring 47. Accordingly, the upper and lower open/close valves 41 and 42 are displaced downward due to the pressure of the hydraulic fluid 10 in the lower piston pressure chamber 12B so that the upper open/close valve 41 is opened relative to the valve seat 45 while the lower open/close valve 42 is closed relative to the flow passage 46 of the upper open/close valve 41. As a result, the lower piston pressure chamber 12B communicates with the reserve chamber 13 via the compression-side communication passages 17A, 17B and 17C.

In the compression stroke of the shock absorber 5 in the cushion unit 3, the piston 11 moves toward a side of the lower piston pressure chamber 12B in FIG. 2. Accordingly, as shown by the continuous-line arrows in FIG. 3, the hydraulic fluid 10 in the lower piston pressure chamber 12B flows into the compression-side communication passage 17B via the compression-side communication passage 17A by deflecting the compression-side disc valve 24, and then flows into the reserve chamber 13 via the valve seat 45 and the compression-side communication passage 17C. Simultaneously, the hydraulic fluid 10 in the lower piston pressure chamber 12B also flows into the upper piston pressure chamber 12A via the compression-side flow passages 28 formed in the piston 11 and by opening the second valve 27. However, the main damping force during the compression stroke is generated at the compression-side disc valve 24.

In the extension stroke of the shock absorber 5 in the cushion unit 3, the piston 11 moves toward a side of the upper piston pressure chamber 12A in FIG. 2. Accordingly, as shown by the dashed-line arrows in FIG. 3, the hydraulic fluid 10 in the reserve chamber 13 flows into the lower piston pressure chamber 12B via the extension-side communication passage 18 and by opening the extension-side check valve 25. Simultaneously, the hydraulic fluid 10 in the upper piston pressure chamber 12A also flows into the lower piston pressure chamber 12B via the extension-side flow passages 29 formed in the piston 11 and by deflecting the first valve 26. The main damping force during the extension stroke is generated due to the deflection of the first valve 26.

[B] Height-Increasing Operation (FIG. 4)

In order to resume the horizontal posture of the vehicle body 1 which has been spoiled due to lowering of the rear of the vehicle body 1, the operating section 70 is operated so as to disengage the engagement portion 76 of the operating pawl 72 from the engagement portion 74 of the operating lever 71. This releases the operating wire 51 from the state pulled in the direction A. Accordingly, the biasing force of the spring 47 presses, via the operating sleeve 48, the lower open/close valve 42 and the upper open/close valve 41 upward in FIG. 4. As a result, the upper open/close valve 41 abuts against the valve seat 45 so as to be closed relative to the valve seat 45. At this time, the lower open/close valve 42 remains closed relative to the flow passage 46 of the upper open/close valve 41. Due to the upper open/close valve 41 being closed, communication between the compression-side communication passages 17B and 17C is prohibited.

In the compression stroke of the shock absorber 5 in the cushion unit 3, as shown by continuous-line arrows in FIG. 4, the hydraulic fluid 10 in the lower piston pressure chamber 12B flows into the compression-side communication passage 17B via the compression-side communication passage 17A by deflecting the compression-side disc valve 24 to generate the damping force, and then flows into the branch flow passage 52A. When the pressure of the hydraulic fluid 10 in the branch flow passage 52A becomes greater than the sum of the biasing force of the spring 55 and the pressure of the hydraulic fluid 10 in the spring bracket pressure chamber 32, the check valve 43 is opened to allow communication between the branch flow passages 52A and 52B. Accordingly, the hydraulic fluid 10 which has reached the branch flow passage 52A from the lower piston pressure chamber 12B is introduced into the hydraulic fluid introducing passage 33 via the branch flow passage 52B, the branch groove 56 and the branch hole 57 and is further conducted into the spring bracket pressure chamber 32 under pressure. As a result, the cylinder spring bracket 22 is forced upward in FIG. 2 so as to compress the suspension spring 4.

In the extension stroke of the shock absorber 5 in the cushion unit 3, the pressure of the hydraulic fluid 10 in the spring bracket pressure chamber 32 is exerted at the inside 43A of the check valve 43 via the branch flow passage 52B and the passage 58 so as to hold the check valve 43 closed relative to the valve seat 53. Accordingly, as shown by dashed-line arrows in FIG. 4, the hydraulic fluid 10 in the reserve chamber 13 flows into the lower piston pressure chamber 12B via the extension-side communication passage 18. As a result, during the extension stroke of the shock absorber 5, the compressed state of the suspension spring 4 achieved in the foregoing compression stroke is maintained.

By repetition of the foregoing compression and extension strokes of the shock absorber 5, the suspension spring 4 is gradually compressed to increase a reactive force of the suspension spring 4 so that the height of the rear of the vehicle body 1 is increased. Thereafter, the rear of the vehicle body 1 becomes level with the front so as to resume the horizontal posture of the vehicle body 1.

The hydraulic fluid flow in the compression-side and extension-side flow passages 28 and 29 and the deflection of the first and second valves 26 and 27 during the compression and extension strokes of the shock absorber 5 are the same as those in the normal-height operation described at [A].

[C] Increased-Height Holding Operation (FIG. 5)

When the cylinder spring bracket 22 for the suspension spring 4 rises to a predetermined position in the height-increasing operation described at [B], the pressure in the spring bracket pressure chamber 32 reaches a predetermined value. As shown by a continuous-line arrow in FIG. 5, the pressure in the spring bracket pressure chamber 32 is arranged to act upon the flange portion 63 of the relief valve 44 via the hydraulic fluid introducing passage 33, the branch hole 57, the branch groove 56 and the relief valve operating hole 64. Accordingly, this pressure, when it has reached the predetermined value, works to force the relief valve 44 downward in FIG. 5 against the biasing force of the spring 62 so as to open the relief valve 44 relative to the relief hole 60.

In the compression stroke of the shock absorber 5 in the cushion unit 3, as shown by continuous-line arrows in FIG. 5, the hydraulic fluid 10 in the lower piston pressure chamber 12B does not flow into the branch flow passage 52A, but flows into the reserve chamber 13 via the compression-side communication passages 17A and 17B, the relief flow passage 59A, the relief hole 60 and the relief flow passage 59B in turn.

In the extension stroke of the shock absorber 5 in the cushion unit 3, as shown by dashed-line arrows in FIG. 5, the hydraulic fluid 10 in the reserve chamber 13 flows into the lower piston pressure chamber 12B via the extension-side communication passage 18.

The hydraulic fluid flow in the compression-side and extension-side flow passages 28 and 29 and the deflection of the first and second valves 26 and 27 during the compression and extension strokes of the shock absorber 5 are the same as those in the normal-height operation described at [A].

Accordingly, during the compression and extension strokes of the shock absorber 5, the same damping forces as those in the normal-height operation described at [A] are achieved while the increased height achieved in the height-increasing operation described at [B] is maintained.

[D] Height-Lowering or -Resuming Operation (FIG. 6)

In order to lower the raised rear of the vehicle body 1 or resume the initial normal height after unloading goods from the load-carrying platform, the operating section 70 is operated so as to engage the engagement portion 76 of the operating pawl 72 with the engagement portion 74 of the operating lever 71. This causes the operating wire 51 to be pulled in the direction A in FIG. 6. At this time, as shown by continuous-line arrows in FIG. 6, the hydraulic fluid 10 in the spring bracket pressure chamber 32 reaches a flow passage 65 formed in the housing 16 via the hydraulic fluid introducing passage 33, the branch hole 57, the branch groove 56 and the branch flow passage 52B in turn. This causes the lower open/close valve 42 to displace downward in FIG. 6 to a position where it abuts against the operating sleeve 48 which is also displaced downward against the biasing force of the spring 47 due to the pulled operating wire 51. As a result, the lower open/close valve 42 is opened relative to the flow passage 46 of the upper open/close valve 41. Thus, the hydraulic fluid 10 reaching the flow passage 65 is conducted into the flow passage 46 of the upper open/close valve 41 and then flows into the reserve chamber 13 via the compression-side communication passage 17C.

In this manner, the pressure of the hydraulic fluid 10 in the spring bracket pressure chamber 32 is lowered to cause the cylinder spring bracket 22 to displace downward. Thus, the raised rear of the vehicle body 1 is lowered to the initial normal position. Further, since the pressure drop in the spring bracket pressure chamber 32 causes the pressures applied to the flange portion 63 of the relief valve 44 and to the flow passage 46 of the upper open/close valve 41 to be also lowered, the relief valve 44 and the upper open/close valve 41 return to their respective states of the normal-height operation described at [A].

[E] Effect

In the foregoing first embodiment, when the operating lever 71 and the operating pawl 72 at the operating section 70 are operated to release the pulled state of the operating wire 51 so as to close the upper and lower open/close valves 41 and 42, the check valve 43 is opened to establish communication between the lower piston pressure chamber 12B and the spring bracket pressure chamber 32 via the compression-side communication passages 17A and 17B, the branch flow passages 52A and 52B, the branch groove 56, the branch hole 57 and the hydraulic fluid introducing passage 33. This allows the hydraulic fluid 10 in the lower piston pressure chamber 12B to be conducted into the spring bracket pressure chamber 32 under pressure due to the extension/compression motion of the shock absorber 5 in the cushion unit 3 so that the cylinder spring bracket 22 is displaced upward. As a result, the reactive force of the suspension spring 4 is increased to raise the rear of the vehicle body 1.

Since the height control is based only on the supply of the hydraulic fluid 10 caused by the extension/compression motion of the shock absorber 5, a separate hydraulic pump or the like for the height control is not required so that the height control can be accomplished with less costly equipment.

Further, since height control is performed by operating the operating lever 71 and the operating pawl 72 of the operating section 70 arranged at the driver's seat or at the load-carrying platform for operating the operating wire 51 to select the open/close operations of the upper and lower open/close valves 41 and 42, height control can be undertaken only when needed.

Further, air can be taken out from the spring bracket pressure chamber 32 via the air vent passage 35 by removing the closure plug 36 when assembling the cushion unit 3. Accordingly, the hydraulic fluid 10 from the lower piston pressure chamber 12B can be smoothly supplied into the spring bracket pressure chamber 32 so as to fill the spring bracket pressure chamber 32 only with the hydraulic fluid 10. As a result, the cylinder spring bracket 22 can be smoothly and reliably displaced in a sliding manner by means of the hydraulic fluid 10 which is supplied under pressure due to the extension/compression motion of the shock absorber 5, so that the reliable height control is ensured.

In the foregoing first embodiment, the operating wire 51 is used for selecting the open/close behavior of the upper and lower open/close valves 41 and 42. However, a solenoid valve may be provided instead of the operating wire 51 for selecting the open/close operations of the upper and lower open/close valves 41 and 42 by controlling energization of the solenoid valve using a switch arranged at the driver's seat or at the load-carrying platform. Further, the cushion units 3 may be provided for all of the four wheels, that is, one for each wheel.

SECOND EMBODIMENT (FIG. 8)

Figure 8:
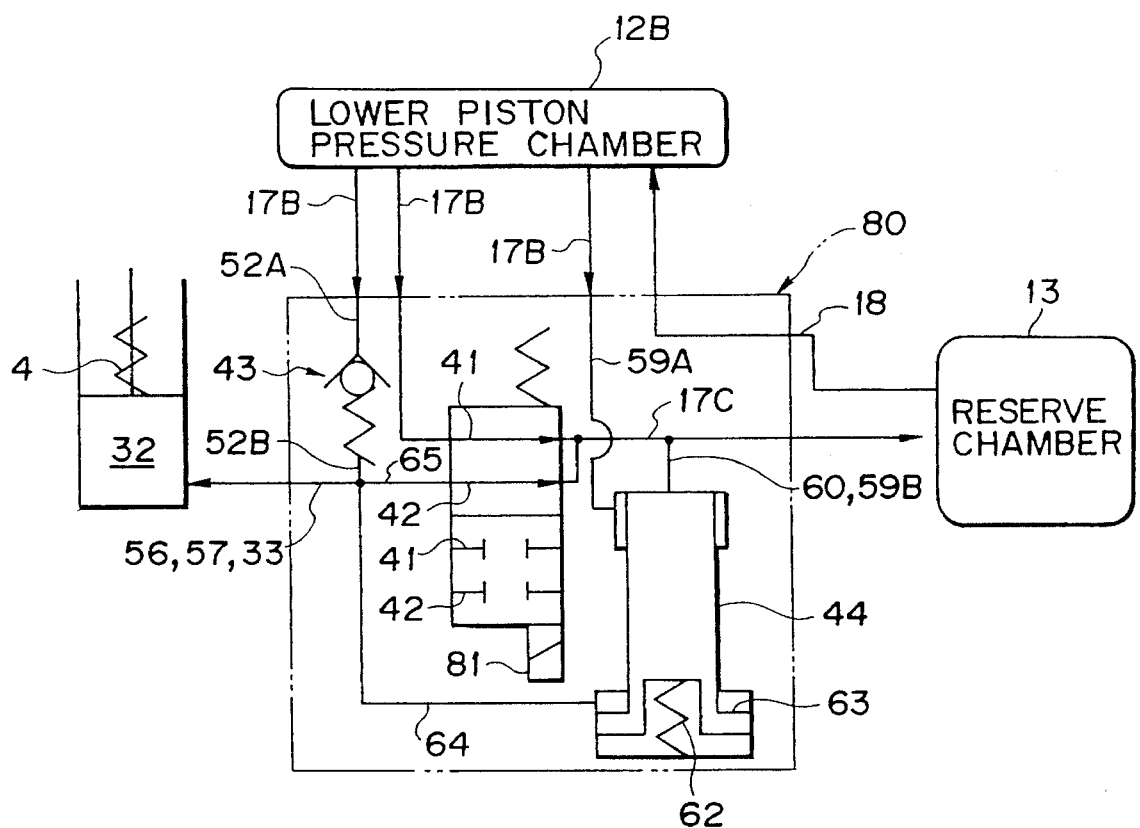
FIG. 8 is a diagram of a hydraulic circuit representing a switching device of a hydraulic shock absorber of a cushion unit according to a second embodiment of the present invention.

FIG. 8 shows a hydraulic circuit representing a switching device of a hydraulic shock absorber of a cushion unit according to a second embodiment of the present invention.

Components in the second embodiment which are the same as or similar to those in the first embodiment are represented by the same reference symbols as those in the first embodiment so as to omit explanation thereof.

The switching device 80 in the second embodiment includes, instead of the operating sleeve 48, a solenoid valve 81 which is energized or deenergized for selecting the open/close operations of the upper and lower open/close valves 41 and 42. Accordingly, in the second embodiment, the operating section 70 provided at the driver's seat or at the load-carrying platform is arranged to energize or deenergize the solenoid valve 81.

Specifically, when the solenoid valve 81 is deenergized, the upper open/close valve 41 is allowed to be opened so that the hydraulic fluid 10 in the lower piston pressure chamber 12B flows into the reserve chamber 13 via the compression-side communication passage 17B, the upper open/close valve 41 and the compression-side communication passage 17C in the compression stroke of the cushion unit 3. On the other hand, the hydraulic fluid 10 in the reserve chamber 13 is allowed to flow into the lower piston pressure chamber 12B via the extension-side communication passage 18 in the extension stroke of the cushion unit 3. At this time, the lower open/close valve 42 is held closed relative to the flow passage 46 of the upper open/close valve 41 since the check valve 43 is held closed as corresponding to FIG. 3.

On the other hand, when the solenoid valve 81 is energized so as to raise the rear of the vehicle body 1, the upper and lower open/close valves 41 and 42 are closed. Accordingly, in the compression stroke of the cushion unit 3, the check valve 43 is opened to allow the hydraulic fluid 10 in the lower piston pressure chamber 12B to be conducted into the spring bracket pressure chamber 32 via the branch flow passage 52A, the check valve 43, the branch flow passage 52B, the branch groove 56, the branch hole 57 and the hydraulic fluid introducing passage 33 so that the rear of the vehicle body 1 is raised.

When a pressure of the hydraulic fluid 10 in the spring bracket pressure chamber 32 reaches a predetermined value, this pressure, on being exerted onto the flange portion 63 of the relief valve 44 via the relief valve operating hole 64, opens the relief valve 44. Thereafter, in the compression stroke of the cushion unit 3, the hydraulic fluid 10 in the lower piston pressure chamber 12B is conducted into the reserve chamber 13 via the compression-side communication passage 17B, the relief flow passage 59A, the relief valve 44, the relief hole 60 and the relief flow passage 59B so that the raised state of the rear of the vehicle body 1 is maintained.

On the other hand, when lowering the rear of the vehicle body 1, the solenoid valve 81 is deenergized so as to allow the upper and lower open/close valves 41 and 42 to be opened. This causes the hydraulic fluid 10 in the spring bracket pressure chamber 32 to be conducted into the reserve chamber 13 via the hydraulic fluid introducing passage 33, the branch hole 57, the branch groove 56, the branch flow passage 52B, the flow passage 65, the lower open/close valve 42 and the compression-side communication passage 17C so that the rear of the vehicle body 1 is lowered to the initial normal position. At this time, during the compression stroke of the cushion unit 3, the hydraulic fluid 10 in the lower piston pressure chamber 12B is conducted into the reserve chamber 13 via the compression-side communication passage 17B, the upper open/close valve 41 and the compression-side communication passage 17C, and thus does not work to raise the rear of the vehicle body 1.

In the second embodiment, since the operating section 70 electrically operates the upper and lower open/close valves 41 and 42, the structure associated with the operating section 70 can be simplified.

As appreciated, the second embodiment can also provide effects similar to those in the first embodiment.

Further, as in the first and second embodiments, the cushion units 3 may be provided for all of the four wheels, that is, one for each wheel.

THIRD EMBODIMENT (FIGS. 9–13)

Figure 9:
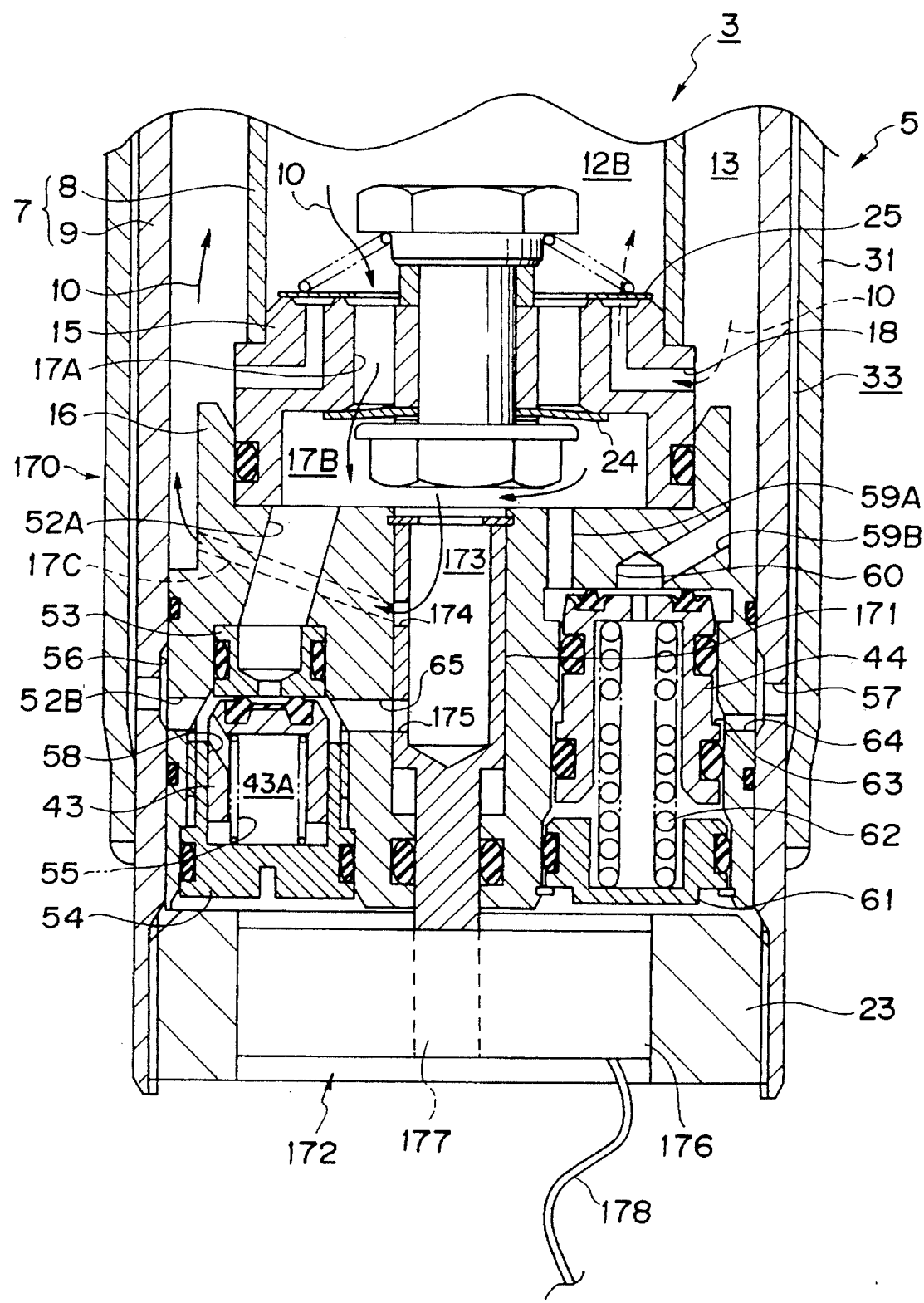
FIG. 9 is a sectional view showing a switching device of a hydraulic shock absorber of a cushion unit according to a third embodiment of the present invention, portraying a normal-height made of the cushion unit.

As shown in FIG. 9, a switching device 170 in the third embodiment includes, instead of the upper and lower open/close valves 41 and 42, a rotary valve 171 which is driven by a rotary solenoid unit 172 or a motor (not shown).

The rotary valve 171 has a shape of a hollow cylinder and is arranged to be rotatable relative to the housing 16. The rotary valve 171 is formed with an upper port 174 and a lower port 175 which respectively communicate with a hollow portion 173. The hollow portion 173 is in communication with the compression-side communication passage 17B. The upper port 174 is capable of allowing or prohibiting communication between the hollow portion 173 and the compression-side communication passage 17C. The lower port 175 is capable of allowing or prohibiting communication between the hollow portion 173 and the flow passage 65. Accordingly, the upper port 174 works like the upper open/close valve 41 in the first embodiment and the lower port 175 works like the lower open/close valve 42 in the first embodiment.

The rotary solenoid unit 172 includes a solenoid 176 and an iron core 177. The iron core 177 is formed integral with the rotary valve 171. The iron core 177 makes normal rotation by a predetermined angle when the solenoid 176 is energized in one direction. On the other hand, the iron core 177 makes reverse rotation by a predetermined angle when the solenoid 176 is energized in the opposite direction. Accordingly, the integral rotary valve 171 with normal or reverse rotation through the upper port 174 allows or prohibits communication between the compression-side communication passages 17B and 17C via the hollow portion 173 and through the lower port 175, in cooperation with the upper port 174, allows or prohibits communication between the flow passage 65 and the compression-side communication passage 17C via the hollow portion 173. Numeral 178 in FIG. 9 represents a wiring between the rotary solenoid unit 172 and the operating section.

Now, operations and effects of the third embodiment will be described in detail hereinbelow.

[A] Normal-Height Operation (FIG. 9)

When the operating section is operated to energize the rotary solenoid unit 172 so as to make normal rotation by the predetermined angle, the upper port 174 of the rotary valve 171 establishes communication between the compression-side communication passages 17B and 17C. Simultaneously, the lower port 175 also establishes communication between the flow passage 65 and the compression-side communication passage 17C in cooperation with the upper port 174. However, since a pressure of the hydraulic fluid 10 in the spring bracket pressure chamber 32 is lower than that in the lower piston pressure chamber 12B, the hydraulic fluid 10 does not flow from the spring bracket pressure chamber 32 toward the compression-side communication passage 17C.

In the compression stroke of the shock absorber 5 in the cushion unit 3, as shown by continuous-line arrows in FIG. 9, the hydraulic fluid 10 in the lower piston pressure chamber 12B reaches the compression-side communication passage 17B by deflecting the compression-side disc valve 24 to generate the damping force, and then flows into the reserve chamber 13 via the hollow portion 173, the upper port 174 and the compression-side communication passage 17C.

On the other hand, in the extension stroke of the shock absorber 5 in the cushion unit 3, as shown by dashed-line arrows in FIG. 9, the hydraulic fluid 10 in the reserve chamber 13 flows into the lower piston pressure chamber 12B via the extension-side communication passage 18.

Figure 10:
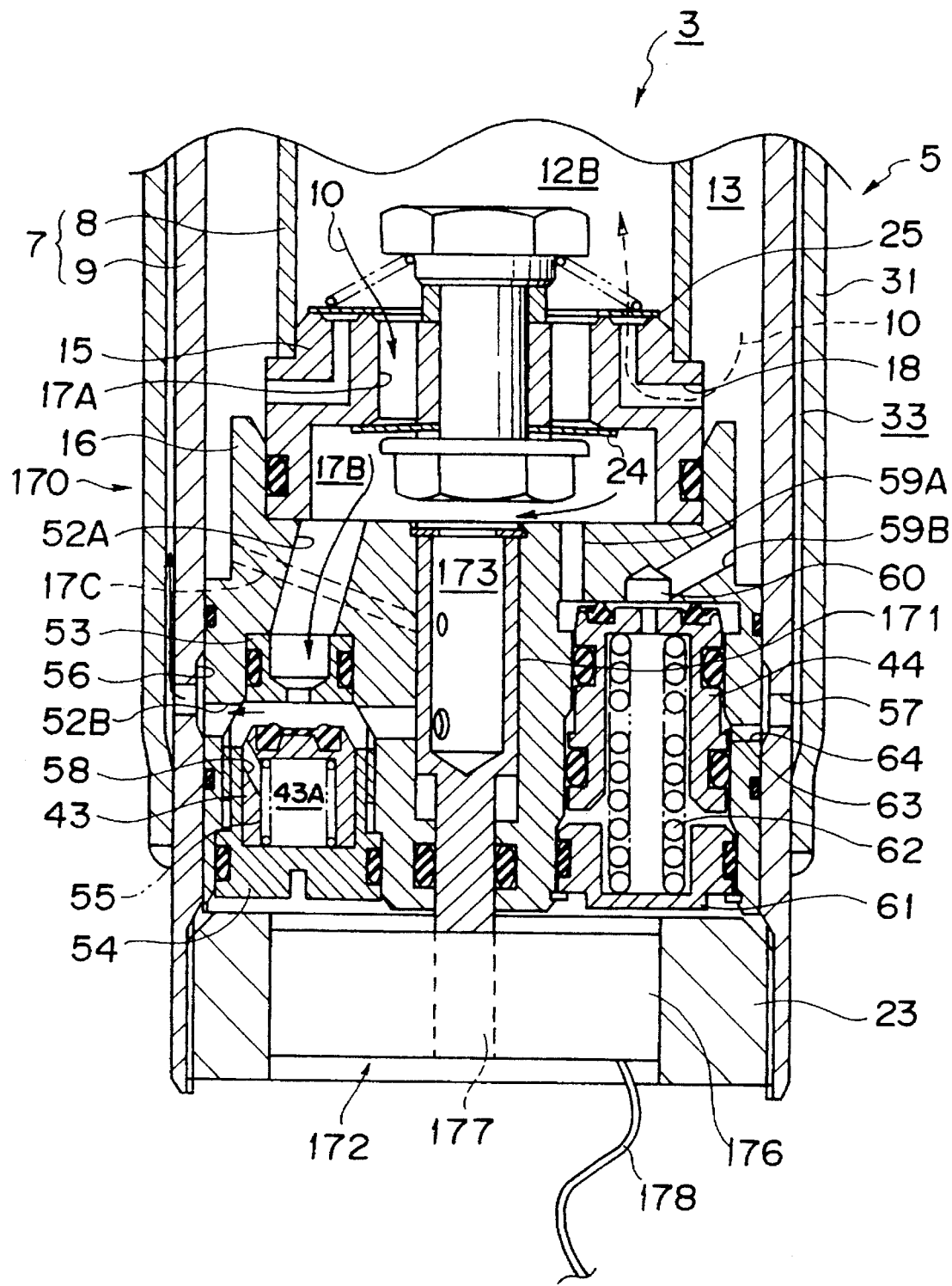
FIG. 10 is a sectional view showing the switching device according to the third embodiment for portraying a height-increasing operation of the cushion unit.

[B] Height-Increasing Operation (FIG. 10)

When the operating section is operated to energize the rotary solenoid unit 172 so as to reverse rotation by a predetermined angle, the upper port 174 prohibits communication between the compression-side communication passages 17B and 17C. Simultaneously, the lower port 175 also prohibits communication between the compression-side communication passage 17B and the flow passage 65.

In the compression stroke of the shock absorber 5 in the cushion unit 3, as shown by continuous-line arrows in FIG. 10, the hydraulic fluid 10 in the lower piston pressure chamber 12B reaches the compression-side communication passage 17B via the compression-side communication passage 17A, by deflecting the compression-side disc valve 24 to generate the damping force. When a pressure in the lower piston pressure chamber 12B is higher than that in the spring bracket pressure chamber 32, the hydraulic fluid 10 reaching the compression-side communication passage 17B flows into the branch flow passage 52A to open the check valve 43 and then into the spring bracket pressure chamber 32 via the branch flow passage 52B, the branch groove 56, the branch hole 57 and the hydraulic fluid introducing passage 33. This causes the cylinder spring bracket 22 to be raised so that the suspension spring 4 is compressed.

In the extension stroke of the shock absorber 5 in the cushion unit 3, the pressure in the spring bracket pressure chamber 32 is exerted at the inside 43A of the check valve 43 so as to close the check valve 43. Accordingly, as shown by a dashed-line arrow in FIG. 10, the hydraulic fluid 10 in the reserve chamber 13 is conducted into the lower piston pressure chamber 12B via the extension-side communication passage 18. During the extension stroke of the shock absorber 5, the compressed state of the suspension spring 4 achieved in the foregoing compression stroke is maintained. By repetition of the foregoing compression and extension strokes of the shock absorber 5, the suspension spring 4 is gradually compressed to increase a reactive force of the suspension spring 4 so that a height of the rear of the vehicle body 1 is increased.

Figure 11:
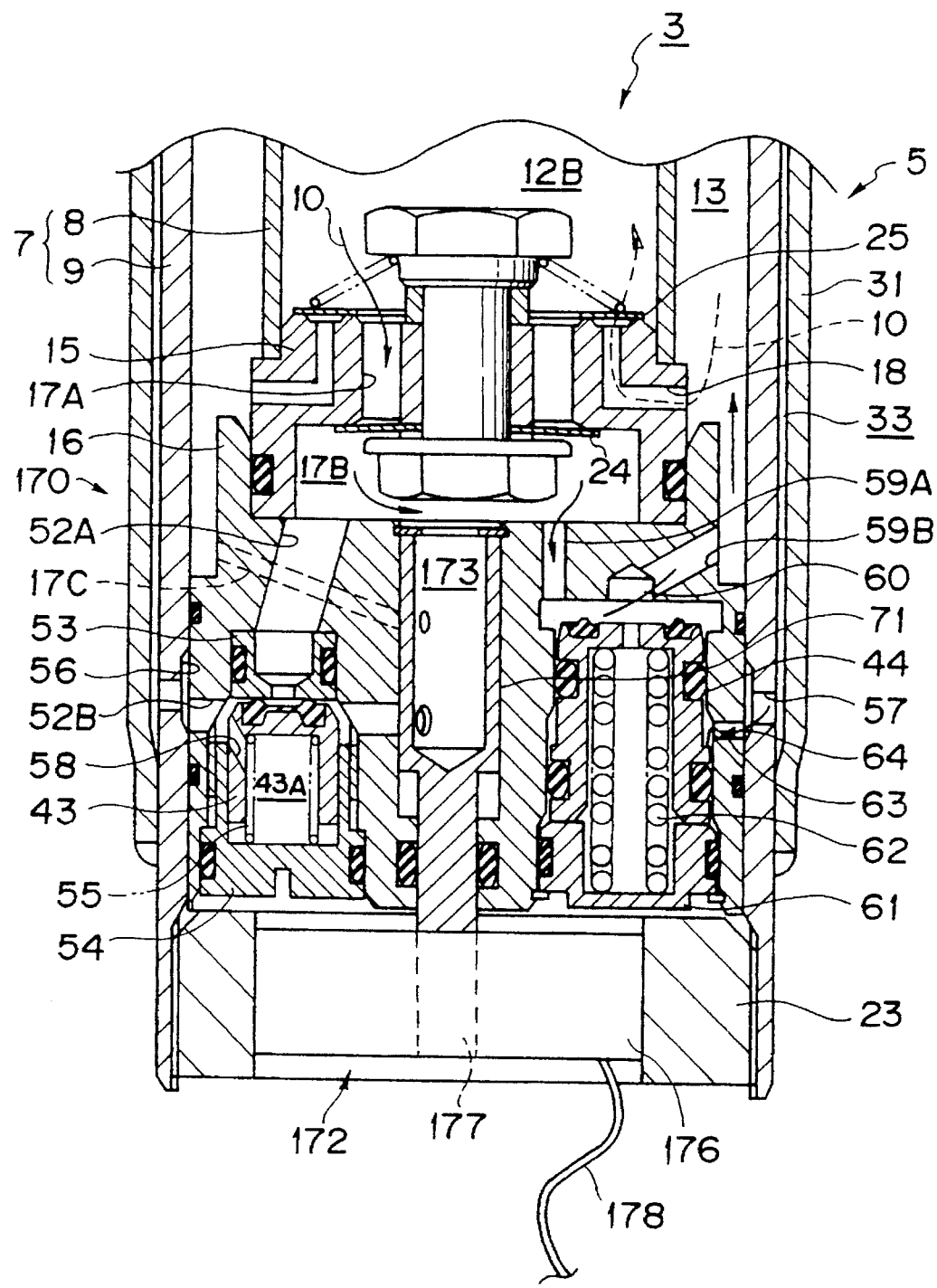
FIG. 11 is a sectional view showing the switching device according to the third embodiment for portraying an increased-height holding function of the cushion unit.

[C] Increased-Height Holding Operation (FIG. 11)

When the cylinder spring bracket 22 for the suspension spring 4 rises to a predetermined position in the height-increasing operation described at [B], the pressure in the spring bracket pressure chamber 32 reaches a predetermined value. The pressure of the hydraulic fluid 10 in the spring bracket pressure chamber 32 is arranged to act upon the flange portion 63 of the relief valve 44 via the hydraulic fluid introducing passage 33, the branch hole 57, the branch groove 56 and the relief valve operating hole 64. Accordingly, this pressure, when it has reached the predetermined value, works to force the relief valve 44 downward in FIG. 11 against the biasing force of the spring 62 so as to open the relief valve 44 relative to the relief hole 60.

Accordingly, in the compression stroke of the shock absorber 5 in the cushion unit 3, as shown by continuous-line arrows in FIG. 11, the hydraulic fluid 10 in the lower piston pressure chamber 12B is conducted into the reserve chamber 13 via the compression-side communication passages 17A and 17B, the relief flow passage 59A, the relief hole 60 and the relief flow passage 59B in turn.

In the extension stroke of the shock absorber 5 in the cushion unit 3, as shown by a dashed-line arrow in FIG. 11, the hydraulic fluid 10 in the reserve chamber 13 flows into the lower piston pressure chamber 12B via the extension-side communication passage 18.

Accordingly, the increased height achieved in the height-increasing operation described at [B] does not increase any more and is maintained.

Figure 12:
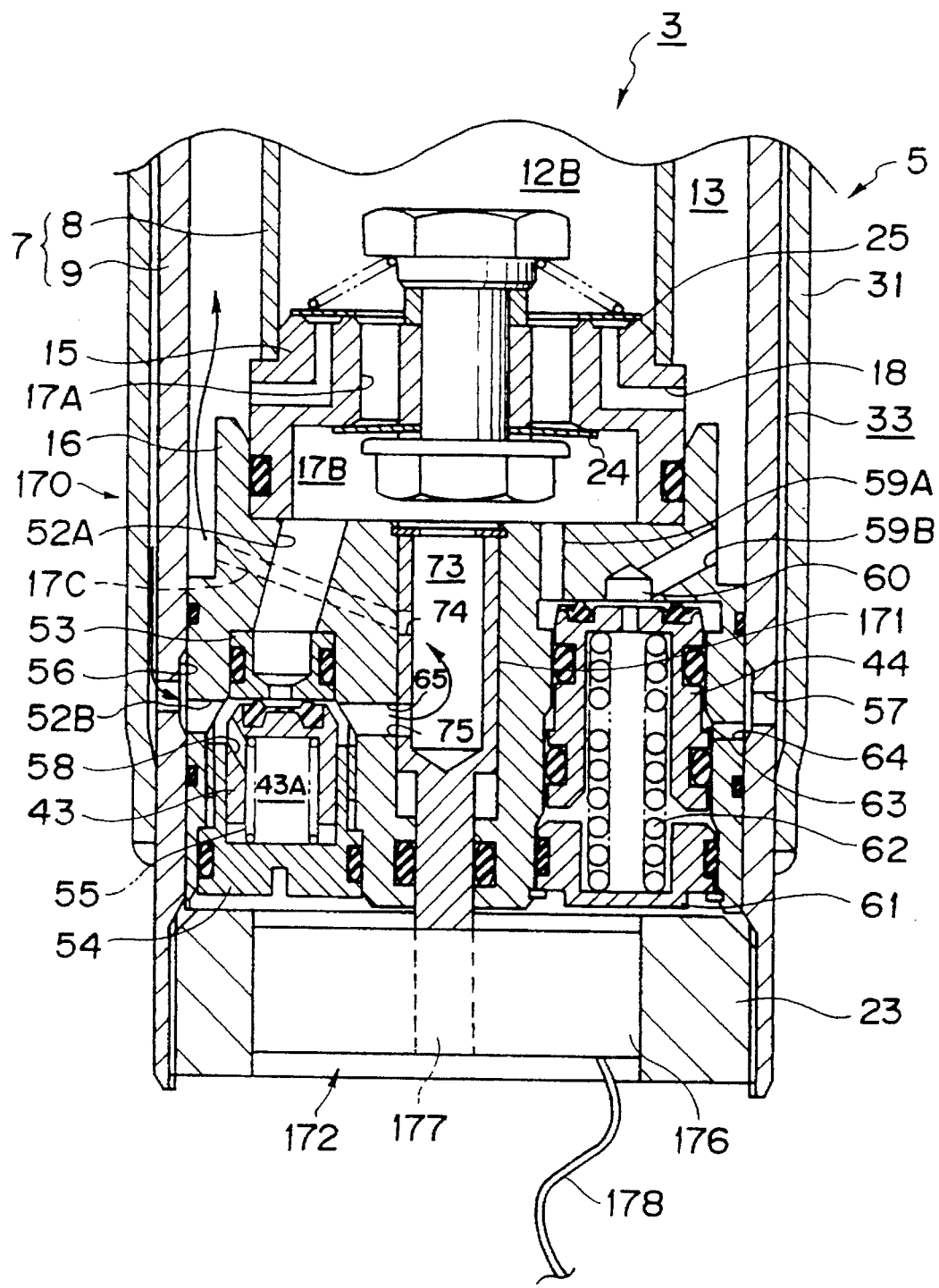
FIG. 12 is a sectional view showing the switching device according to the third embodiment for portraying a height-lowering function of the cushion unit.

[D] Height-Lowering or -Resuming Operation (FIG. 12)

When the operating section is operated to energize the rotary solenoid unit 172 so as to make normal rotation, the upper port 174 of the rotary valve 171 allows communication between the compression-side communication passages 17B and 17C, and the lower port 175 allows communication between the compression-side communication passage 17C and the flow passage 65 via the upper port 174. Accordingly, as shown by continuous-line arrows in FIG. 12, the hydraulic fluid 10 in the spring bracket pressure chamber 32 passes into the reserve chamber 13 via the hydraulic fluid introducing passage 33, the branch hole 57, the branch groove 56, the branch flow passage 52B, the flow passage 65, the lower port 175, the hollow portion 173, the upper port 174 and the compression-side communication passage 17C in turn. As a result, the pressure in the spring bracket pressure chamber 32 is lowered to cause the cylinder spring bracket 22 to displace downward. Thus, the raised rear of the vehicle body 1 is lowered to the initial normal position. At this time, since the pressure applied to the flange portion 63 of the relief valve 44 is also lowered, the relief valve 44 is closed due to the biasing force of the spring 62.

[E] Effect

According to the switching device 170 in the third embodiment, the flow of the hydraulic fluid 10 is switched by controlling the operation of the rotary valve 171 which is driven by the rotary solenoid unit 172 or the motor, so as to achieve the height control of the vehicle body 1. As a result, the number of the associated parts, even including the rotary valve 171 and the rotary solenoid unit 172, can be reduced, and further, the housing 16 at portions around the rotary valve 171 is simple to manufacture. Accordingly, further cost reduction can be realized.

Further, as appreciated, the height control can be executed only when it is needed as in the foregoing first and second embodiments.

Figure 13:
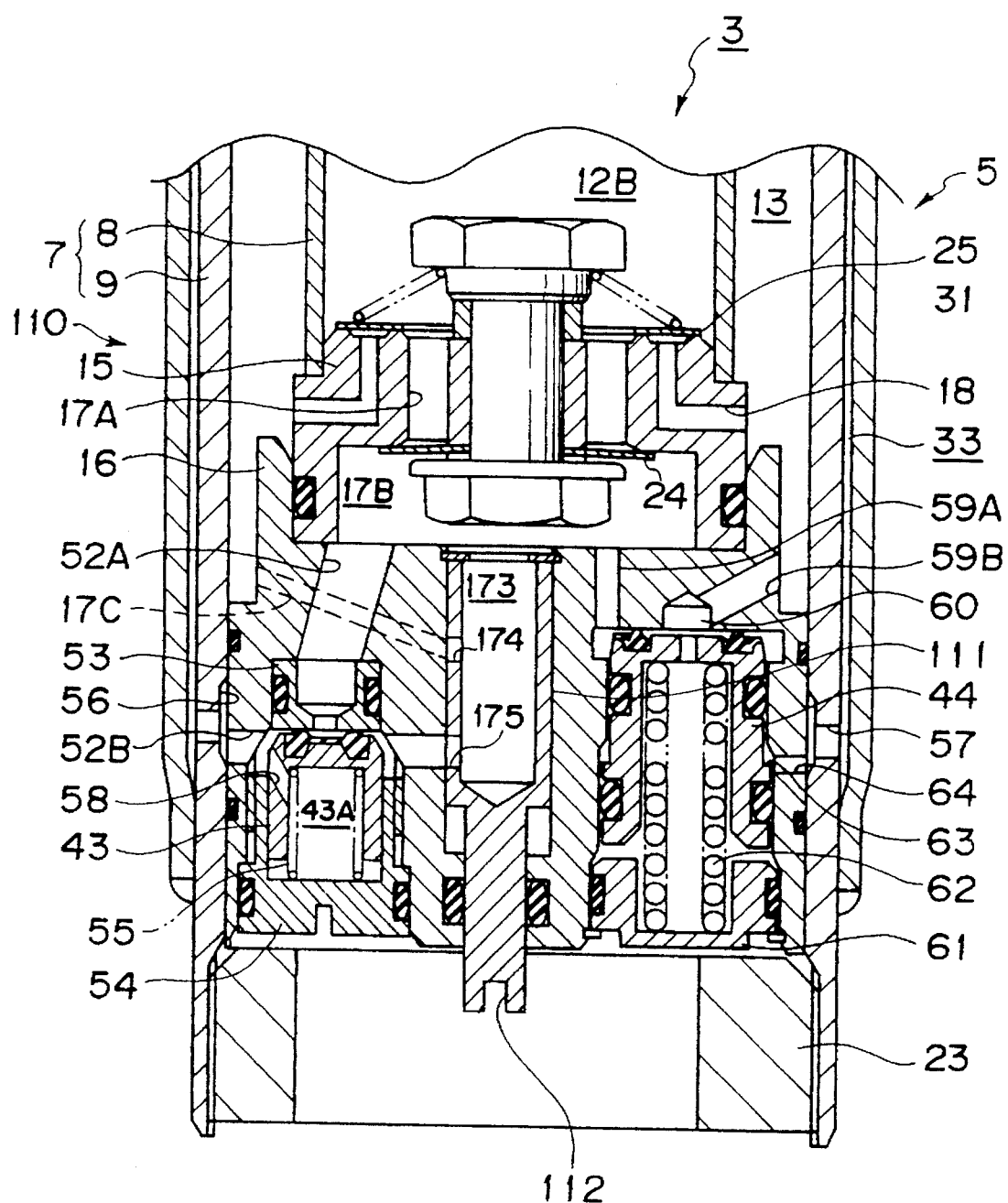
FIG. 13 is a sectional view showing a modification of the switching device in the third embodiment.

FIG. 13 is a sectional view showing a modification of the switching device in the third embodiment.

In this modification, a rotary valve 111 received in a switching device 110 is formed with an operating groove 112 at its lower end in FIG. 13. Accordingly, the rotary valve 111 can be manually operated by engaging a tool, such as a screw-driver into the operating groove 112 and then rotating it.

FOURTH EMBODIMENT (FIG. 14)

Figure 14:
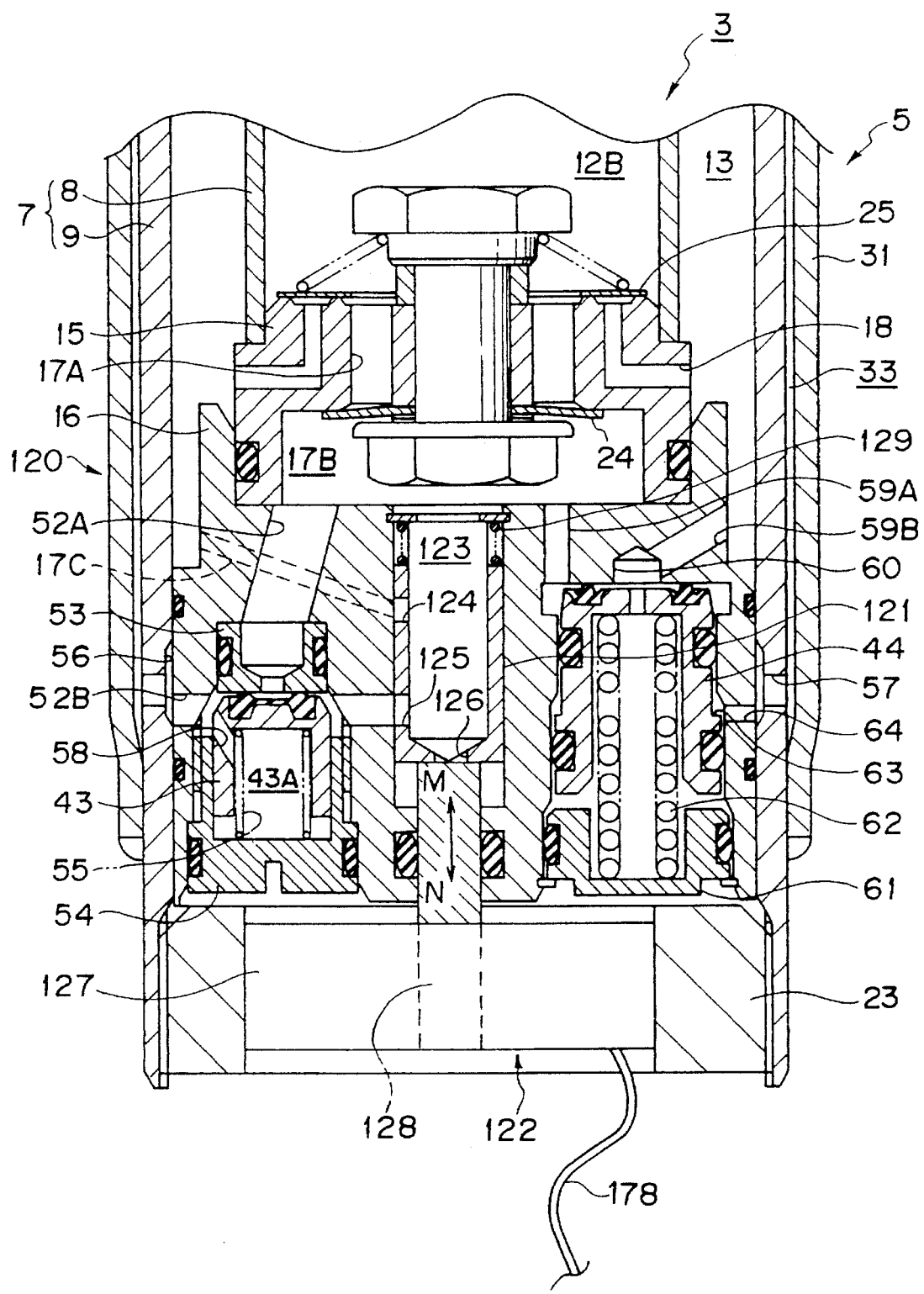
FIG. 14 is a sectional view showing a switching device of a hydraulic shock absorber of a cushion unit according to a fourth embodiment of the present invention.

FIG. 14 is a sectional view showing a switching device of a hydraulic shock absorber of a cushion unit according to a fourth embodiment of the present invention. Components in the fourth embodiment which are the same as or similar to those in the first or third embodiment are represented by the same reference symbols as those in the first or third embodiment so as to omit explanation thereof.

As shown in FIG. 14, the switching device 120 in the fourth embodiment includes, instead of the upper and lower open/close valves 41 and 42 in the first embodiment, a spool valve 121 which is driven by a solenoid unit 122.

The spool valve 121 has a shape of a hollow cylinder and is arranged to be slidable relative to the housing 16 in an axial direction thereof. The spool valve 121 is formed with an upper port 124, a lower port 125 and a communication opening 126 which communicate with a hollow portion 123, respectively.

The solenoid unit 122 includes a solenoid 127 and an iron core 128. The iron core 128 is abutted against a lower end, in FIG. 14, of the spool valve 121 where the communication opening 126 is formed, due to a biasing force of a valve spring 129. The solenoid unit 122 is energized or deenergized to displace the iron core 128 in a direction M or N, respectively, so that the spool valve 121 slides in the same direction. FIG. 14 shows the state where the solenoid unit 122 is deenergized. In the deenergized state of the solenoid unit 122, the upper port 124 of the spool valve 121 establishes communication between the compression-side communication passages 17B and 17C via the hollow portion 123, and the lower port 125, in cooperation with the upper port 124, establishes communication between the compression-side communication passage 17C and the flow passage 65 via the hollow portion 123.

When the solenoid unit 122 is energized, the spool valve 121 is displaced in the direction M against the biasing force of the valve spring 129. This causes the upper port 124 to prohibit communication between the compression-side communication passages 17B and 17C, and further causes the lower port 125 to prohibit communication between the flow passage 65 and the hollow portion 123. Accordingly, the hydraulic fluid 10 in the lower piston pressure chamber 12B is conducted into the spring bracket pressure chamber 32 in a manner as in FIG. 10, so that the height of the rear of the vehicle body 1 is increased. When the height increasing function is finished or completed, the hydraulic fluid 10 in the lower piston pressure chamber 12B flows into the reserve chamber 13 in a manner as in FIG. 11.

When lowering the raised rear, the solenoid unit 122 is deenergized so as to displace the spool valve 121 in the direction N in FIG. 14. This causes the upper port 124 to allow communication between the compression-side communication passages 17B and 17C, and further causes the lower port 125 to allow communication between the flow passage 65 and the compression-side communication passage 17C via the upper port 124. Accordingly, the hydraulic fluid 10 in the spring bracket pressure chamber 32 flows into the reserve chamber 13 in a manner as in FIG. 12 so that the pressure in the spring bracket pressure chamber 32 is decreased to lower the height of the rear of the vehicle body 1.

The fourth embodiment achieves effects similar to those achieved in the third embodiment. Accordingly, the height control can be effectively executed without great-expense and according to need. Further, the processing of the structure around the spool valve 121 and the solenoid 122 is simple to manufacture, which leads to further cost reduction.

It is to be understood that this invention is not to be limited to the embodiments and modifications described above, and that various changes and modifications may be made without departing from the spirit and scope of the invention as defined in the appended claims.

What is claimed is:

1. A cushion unit having an hydraulic shock absorber disposed along a vertical axis, said shock absorber constructed of a cylinder with an inner tube and an outer tube, the inner tube filled with a hydraulic fluid and retaining a piston therein which is slidably disposed along the axis to define an upper and a lower piston pressure chamber, the inner and outer tubes defining therebetween a reserve chamber which is filled with a gas and the same hydraulic fluid, a bottom piece fixed at a lower end of the inner tube and forming a compression-side communication passage capable of allowing the hydraulic fluid to flow from the lower piston pressure chamber into the reserve chamber and an extension-side communication passage capable of allowing the hydraulic fluid to flow from the reserve chamber into the lower piston pressure chamber, the piston having a piston rod with an outer periphery extending therefrom with a rod spring bracket disposed on said outer periphery of the piston rod, a cylinder spring bracket disposed on an outer periphery of the outer tube and a suspension spring capable of producing a reaction force when acted upon, the suspension spring interposed between the rod spring bracket and the cylinder spring bracket, the cushion unit further comprising:

a spring bracket pressure chamber interposed between said cylinder spring bracket and said outer tube, said spring bracket pressure chamber formed such that the cylinder spring bracket can be slid in the axial direction of the cylinder by pressure of the hydraulic fluid acting thereagainst;

a housing integrally connected to said bottom piece and fixed at a lower end of the outer tube, the housing provided with a flow passage which connects the compression-side communication passage of the bottom piece to the reserve chamber, and flow passages which connect the compression-side communication passage of the bottom piece to the spring bracket pressure chamber, as well as a flow passage connecting the spring bracket pressure chamber to the reserve chamber;

open/close valves disposed in the flow passage connecting the compression-side communication passage of the bottom piece to the reserve chamber and in the flow passage connecting the spring bracket pressure chamber to the reserve chamber, said open/close valves operable in one of an open and a closed position in response to an open/close external demand thereupon;

a check valve disposed in one of the flow passages connecting the compression-side communication passage to the spring bracket pressure chamber, said check valve capable of allowing the hydraulic fluid to flow from the compression-side communication passage into the spring bracket pressure chamber; and wherein the hydraulic fluid flows through the compression-side communication passage of the bottom piece via the check valve and into the spring bracket pressure chamber when the open/close valves close the flow passage which connects the compression-side communication passage of the bottom piece to the reserve chamber in response to a close external demand, said flow into the spring bracket pressure chamber increasing the reaction force of the suspension spring so as to raise a height of the vehicle body, and when the open/close valves open the flow passage connecting the spring bracket pressure chamber to the reserve chamber in response to an open external demand, the hydraulic fluid in the spring bracket pressure chamber is returned to the reserve chamber, thereby decreasing the reactive force of the suspension spring so as to lower said height of the vehicle body.

2. The cushion unit as set forth in claim 1, wherein an operating section for providing the demand signals is adapted to be disposed at one of a drivers seat of said vehicle and a load-carrying platform of the vehicle.

3. The cushion unit as set forth in claim 1, wherein an operating section for providing the demand signals is indirectly connected to the open/close valves by an actuating wire.

4. The cushion unit as set forth in claim 1, wherein said unit is adapted to be disposed between a body of said vehicle and a rear axle of the vehicle.

5. The cushion unit as set forth in claim 1, wherein a relief valve is disposed in one of the flow passages and is urged to close the flow passages connecting the compression-side communication passage of the bottom piece to the reserve chamber, the relief valve operable to allow passage of fluid through said flow passages when a pressure in the spring bracket pressure chamber reaches a predetermined value.

* * * * *